United States Patent
Henze et al.

(10) Patent No.: US 11,698,734 B2
(45) Date of Patent: Jul. 11, 2023

(54) COLLISION REDUCTION THROUGH JUST-IN-TIME RESOURCE ALLOCATION

(71) Applicant: Seagate Technology LLC, Fremont, CA (US)

(72) Inventors: Jonathan M. Henze, Savage, MN (US); Jeffrey J. Pream, Berthoud, CO (US); Ryan J. Goss, Prior Lake, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/380,708

(22) Filed: Jul. 20, 2021

(65) Prior Publication Data

US 2022/0027069 A1  Jan. 27, 2022

Related U.S. Application Data

(60) Provisional application No. 62/705,914, filed on Jul. 22, 2020.

(51) Int. Cl.
*G06F 3/06* (2006.01)

(52) U.S. Cl.
CPC ......... *G06F 3/0631* (2013.01); *G06F 3/0619* (2013.01); *G06F 3/0655* (2013.01); *G06F 3/0679* (2013.01)

(58) Field of Classification Search
CPC .... G06F 3/0631; G06F 3/0679; G06F 3/0655; G06F 3/0619
See application file for complete search history.

(56) References Cited

U.S. PATENT DOCUMENTS

| | | | |
|---|---|---|---|
| 6,959,365 B2 | 10/2005 | Ootani et al. | |
| 7,978,516 B2 | 7/2011 | Olbrich et al. | |
| 8,228,701 B2 | 7/2012 | Sokolov et al. | |
| 8,938,583 B1 | 1/2015 | Suryabudi | |
| 10,528,464 B2 | 1/2020 | Ishiyama et al. | |
| 10,846,225 B1* | 11/2020 | Matthews | G06F 12/06 |
| 2009/0292865 A1* | 11/2009 | Hong | G06F 3/0659 |
| | | | 710/22 |
| 2013/0019053 A1 | 1/2013 | Somanache et al. | |
| 2017/0308433 A1* | 10/2017 | Kwon | G11C 29/52 |
| 2018/0136877 A1* | 5/2018 | Ouyang | G11C 16/32 |
| 2020/0150903 A1* | 5/2020 | Chu | G06F 3/0688 |
| 2021/0365209 A1* | 11/2021 | L'Ecuyer | G06F 3/0659 |

* cited by examiner

*Primary Examiner* — Mark A Giardino, Jr.
(74) *Attorney, Agent, or Firm* — Hall Estill Law Firm (57) ABSTRACT

Method and apparatus for managing data in a storage device, such as a solid-state drive (SSD). In some embodiments, a main memory has memory cells arranged on dies arranged as die sets accessible using parallel channels. A controller is configured to arbitrate resources required by access commands to transfer data to or from the main memory using the parallel channels, to monitor an occurrence rate of collisions between commands requiring an overlapping set of the resources, and to adjust a ratio among different types of commands executed by the controller responsive to the occurrence rate of the collisions. In further embodiments, the controller may divide a full command into multiple partial commands, each of which are executed as the associated system resources become available. In some cases, the ratio is established between read commands and write commands issued to the main memory.

18 Claims, 4 Drawing Sheets

COLLISION REDUCTION THROUGH JUST-IN-TIME RESOURCE ALLOCATION

RELATED APPLICATION

The present application makes a claim of domestic priority to U.S. Provisional Patent Application No. 62/705,914 filed Jul. 22, 2020, the contents of which are hereby incorporated by reference.

SUMMARY

Various embodiments of the present disclosure are generally directed to a method and apparatus for enhancing performance of a storage device, such as but not limited to a solid-state drive (SSD).

In some embodiments, a main memory has memory cells arranged on dies arranged as die sets accessible using parallel channels. A controller is configured to arbitrate resources required by access commands to transfer data to or from the main memory using the parallel channels, to monitor an occurrence rate of collisions between commands requiring an overlapping set of the resources, and to adjust a ratio of various types of commands executed by the controller responsive to the occurrence rate of the collisions. In further embodiments, the controller may divide a full command into multiple partial commands, each of which are executed as the associated system resources become available.

These and other features and advantages which characterize the various embodiments of the present disclosure can be understood in view of the following detailed discussion and the accompanying drawings.

DETAILED DESCRIPTION

The present disclosure generally relates to the management of data transfer commands in a data storage device, such as but not limited to a solid-state drive (SSD).

Storage devices generally include a controller and a non-volatile memory (NVM). The controller communicates with a host (client) device to direct the storage of user data from the client device to the NVM, and to retrieve and transfer the user data from the NVM to the client device.

Solid-state drives (SSDs) are a popular form of storage device commonly used in current generation storage systems. SSDs use solid-state semiconductor memory, such as NAND flash, as the NVM. A flash memory is usually arranged as a number of flash semiconductor dies that are accessible via channels (lanes).

Data sets are distributed across the various dies to allow parallel processing of client access commands (e.g., read commands, write commands, etc.). Background operations are carried out to enable the SSD to service the client access commands at acceptable performance rates. Background commands can include garbage collection, map updates, calibration operations, etc. Client read commands are usually given priority over client write commands and background commands, at least to a degree.

One or more command queues are maintained to accumulate the commands pending execution. A scheduler function of the controller formats, schedules, and forwards the commands to the flash module in an appropriate order and at appropriate times as the resources necessary to execute the commands become available.

A collision generally refers to a situation where two or more pending commands require the same shared resource(s) in order to be completed. In addition to the dies and channels, other resources that can be involved with collisions include shared buffers used to generate/update map information or parity information, LDPC decoders, read and write data buffers used to store data during data transfers or GC (garbage collection), etc.

Collisions tend to degrade performance since commands are left in a pending state until the required resources become available. While some commands can be carried out in parallel if the required resource sets do not overlap (e.g., commands to different dies on different channels), at present a sequential pipeline approach is often used so that, from a time sequence, a first command (C1) is serviced, after which a second command (C2) is serviced, and so on. In this arrangement, all of the required resources need to be available before a command can be executed.

Various embodiments of the present disclosure address these and other limitations of the existing art by providing just-in-time (JIT) resource allocations to reduce collisions among competing pending commands. As explained below, a storage device controller adaptively balances a number of factors including rates at which various types of commands are metered to a non-volatile memory (NVM). The storage device controller may further enable partial commands to be issued and executed as the required resources become available. The commands can be substantially any type of command issued by the controller, including but not limited to read commands, write commands, erase commands, configuration commands, etc.

In some embodiments, initial ratios for execution are set among reads, writes and erases. Without limitation, one such set of ratios may be on the order of one write (W) for every 64 reads (R) and one erase (E) for every 1000 reads. This would provide R, W, E ratios of 1, 1/64 and 1/1000, respectively. These ratios can be monitored and adjusted based on the respective rates of collisions that are encountered during operation. Other ratios can be used.

The performance of partial commands involves allowing those resources that are available to be used as they become available to partially execute a given command. For example, if a large set of data has been requested for retrieval via a read command, the system can operate to read those dies that are currently available, even if all of the dies that are ultimately needed are not currently available. In this way, commands can be partially carried out in parallel, rather than serially as in current systems.

A monitor function in the controller can observe the rate at which collisions occur. The types of collisions can be collected as well. Adjustments can thereafter be made to the system, including allocation changes to the resources as well as the above ratios among different types of commands.

Accordingly, some embodiments may be characterized without limitation as an apparatus with a main memory comprising memory cells each configured to store multiple bits of data, the memory cells arranged on dies accessible using parallel channels. A controller is configured to arbitrate resources required by access commands to transfer data using the parallel channels, to monitor an occurrence rate of collisions between commands requiring an overlapping set of the resources, and to adjust a ratio of a first type of command (such as read commands) to a second type of command (such as write commands) executed by the controller responsive to the occurrence rate of the collisions. Other apparatus combinations, as well as methods for performing these and similar operations, are contemplated as well.

Figure 1:
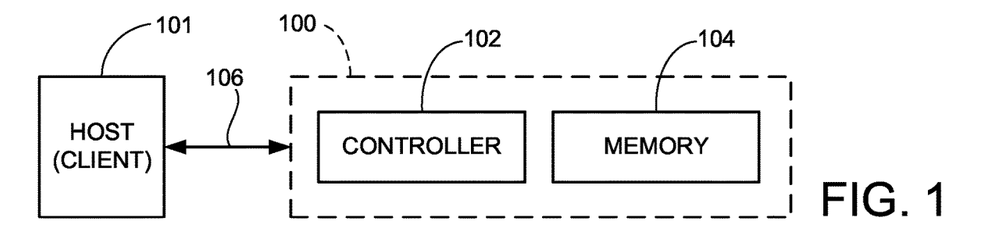
FIG. 1 provides a functional block representation of a data storage device constructed and operated in accordance with various embodiments of the present disclosure.

These and other features and advantages of various embodiments can be understood beginning with a review of FIG. 1 which provides a functional block representation of a data storage device 100. The storage device 100 is coupled to a host (client) device 101.

The storage device 100 includes a controller 102 and a memory 104. The controller 102 provides top-level control of the memory 104 and processes communications with the client 101. The memory 104 provides non-volatile memory (NVM) for the storage of user data from the client. The controller 102 may be a programmable CPU processor that operates in conjunction with programming stored in a computer memory within the device. The controller may alternatively be a hardware controller. Commands and data are transferred between the client device and the storage device using a suitable host interface 106.

Figure 2:
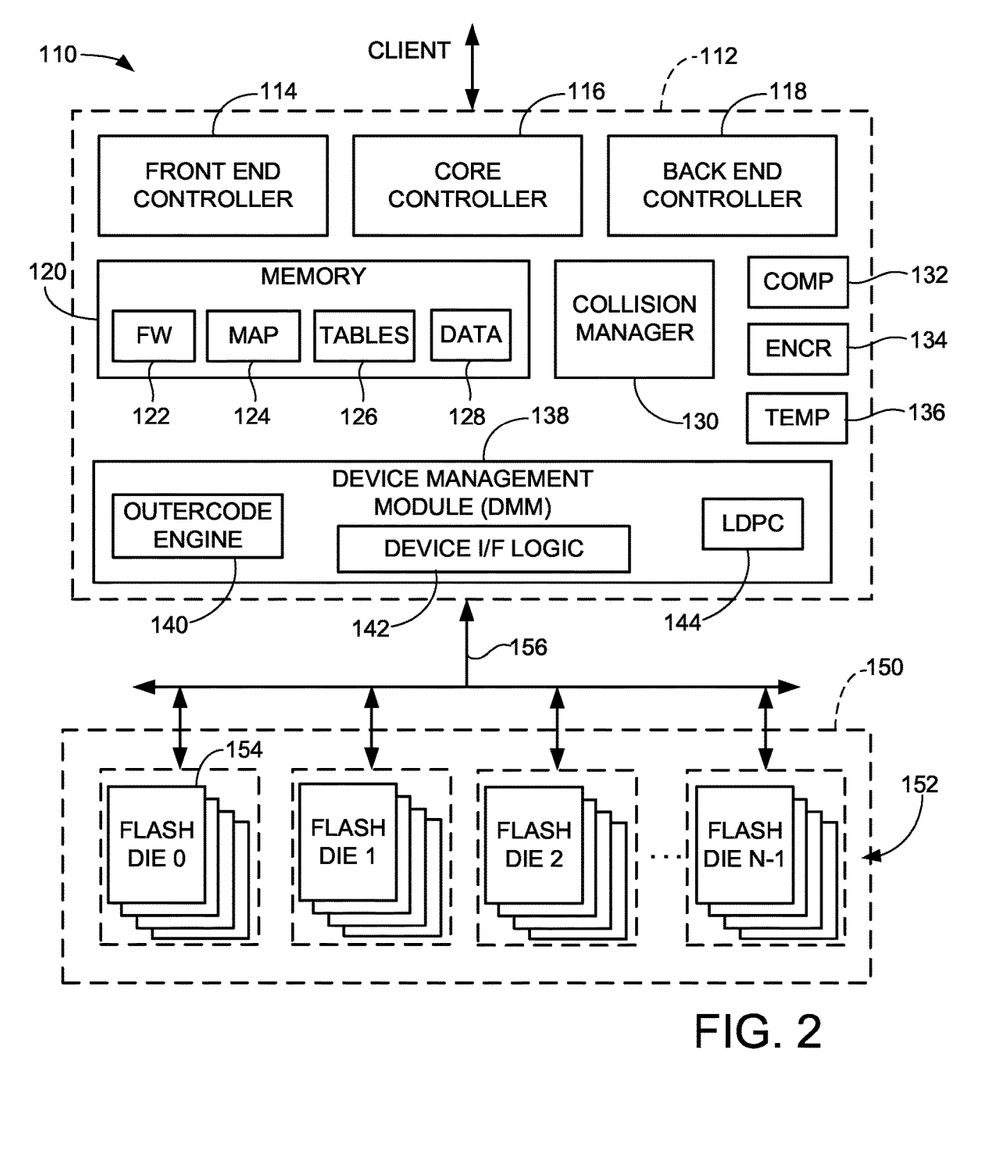
FIG. 2 illustrates the device of FIG. 1 characterized as a solid-state drive (SSD) in accordance with some embodiments.

FIG. 2 describes relevant aspects of an exemplary data storage device 110 corresponding to the device 100 of FIG. 1. The device 110 is a solid-state drive (SSD) that communicates with one or more client devices via one or more Peripheral Component Interface Express (Me) ports. The NVM comprises 3D NAND flash memory, although other forms of memory can be used.

In at least some embodiments, the SSD 110 operates in accordance with the NVMe (Non-Volatile Memory Express) specification, which enables different users to allocate NVM sets (die sets) for use in the storage of data. Each die set may form a portion of an NVMe namespace that may span multiple SSDs or be contained within a single SSD. Each NVMe namespace will be owned and controlled by a different user (owner).

The SSD 110 includes a controller circuit 112 that corresponds to the controller 102 in FIG. 1. The controller circuit 112 has a front end controller 114, a core controller 116 and a back end controller 118. The front end controller 114 performs host IX functions, the back end controller 118 directs data transfers with the memory module and the core controller 116 provides top level control for the device.

Each controller 114, 116 and 118 includes a separate programmable processor with associated programming (e.g., firmware, FW) in a suitable memory location, as well as various hardware elements to execute data management and transfer functions. A controller memory 120 represents various forms of volatile and/or non-volatile memory (e.g., SRAM, DDR DRAM, flash, etc.) utilized as local memory by the controller 112. Various data structures and data sets may be stored by the memory including loaded firmware (FW) 122, map data 124, table data 126 and user data 128 in read/write buffers temporarily cached during host data transfers.

A collision manager circuit 130 is incorporated into the controller 112 using hardware and/or firmware. As explained below, the collision manager manages collisions among commands issued by the client 101 to service client commands and/or internal commands issued by the core controller 116 or other aspects of the SSD.

Continuing with FIG. 2, the controller can include further features such as a data compression block 132 which applies lossless data compression to input data sets during write operations to enhance storage efficiency. An encryption block 134 applies cryptographic processing such as encryption/decryption to provide data security for the SSD. A temperature block 136 uses one or more temperature sensors to monitor and record temperatures of the SSD during operation.

A device management module (DMM) 138 supports back end processing operations of the SSD. The DMM includes an outer code engine circuit 140 to generate outer code, a device I/F logic circuit 142, and a low density parity check (LDPC) circuit 144 configured to generate and use LDPC codes as part of an error detection and correction strategy to protect the data stored by the SSD.

A memory module 150 is coupled to the controller 112 via the DMM 138. The memory module 150 corresponds to the memory 104 in FIG. 1, and includes a non-volatile memory (NVM) in the form of a flash memory 152 distributed across a plural number N of flash memory dies 154. Flash memory control electronics (not separately shown in FIG. 2) facilitate parallel data transfer operations via a plural number M channels (lanes) 156. In one embodiment, the flash memory 150 has 256 dies 154 (e.g., N=256) serviced by 8 channels 156 (e.g., M=8) so that 32 dies are coupled to each channel. Only one die can be accessed by each channel at a time, although up to eight dies can be accessed in parallel at a time using all eight channels. Other arrangements can be used.

While not limiting, modern. SSDs and other data storage device systems are often formed from integrated memory modules such as 104, 150 that are commercially available from a source of such devices. The memory modules are integrated into an SSD by a device manufacturer which supplies the controller functions in a separate controller 102, 112. The controller may be a single integrated circuit such as in the case of a system on chip (SOC) design, or a grouping of integrated circuits.

In this arrangement, the controller and memory modules are separate operational entities which communicate across one or more internal command and data interfaces. A pull system is commonly used in Which the controller issues commands to the memory, and then repetitively sends status inquiries to the memory to determine whether the commands have been completed.

Once the memory signals that a particular command has been completed, the controller may issue additional commands to the memory. For example, when the memory sends a command complete status for a read command, the controller may send a data transfer command to cause the memory to transfer the recovered data to the controller. While any number of different schemes can be employed to handle the interactions between the controller and the memory, it will be noted at this point that the various embodiments presented herein are particularly directed to improvements in the command and data exchanges between the controller and the memory.

Figure 3:
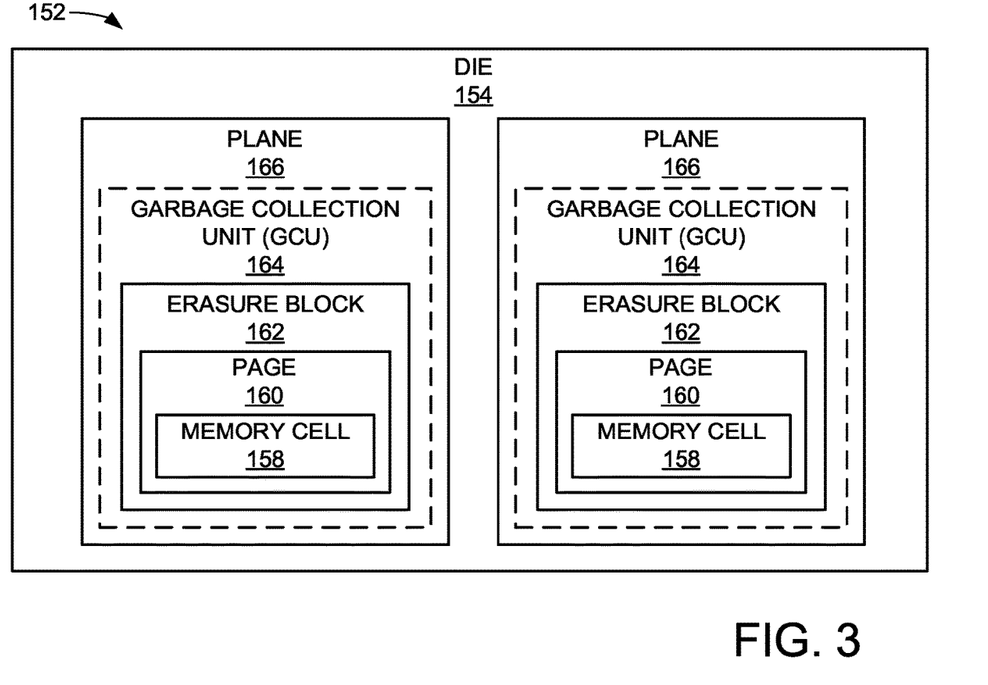
FIG. 3 shows a physical and logical layout of a flash die from FIG. 2 in some embodiments.

FIG. 3 shows a physical/logical arrangement of the various flash memory dies 154 in the flash memory 152 of FIG. 2 in some embodiments. Each die 154 incorporates a large number of flash memory cells 158. The cells may be arrayed in a three-dimensional (3D stacked) arrangement with various control lines (e.g., source, bit, word lines) to access the cells.

Groups of cells 158 are interconnected to a common word line to accommodate pages 160, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), 4LCs (four-level cells with four bits per cell), and so on. Generally, n bits of data can be stored to a particular memory cell 158 using $2^n$ different charge states (e.g., TLCs use eight distinct charge levels to represent three bits of data, 4LCs use sixteen distinct charge levels to represent four bits of data, etc.). The storage size of a page can vary; some current generation flash memory pages are arranged to store 32 KB (32,768 bytes) of user data plus associated LDPC code bits.

The memory cells 158 associated with a number of pages are integrated into an erasure block 162, which represents the smallest grouping of memory cells that can be concurrently erased in a NAND flash memory. A number of erasure blocks 162 are incorporated into a garbage collection unit (GCU) 164, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle (garbage collect) the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 164 nominally uses a single erasure block 162 from each of a plurality of dies 154, such as 32 dies. The dies in a given GCU may be affixed to a single channel 156, or spread across multiple channels (see FIG. 2).

Each die 154 may further be organized as a plurality of planes 166. Examples include two planes per die as shown in FIG. 3, although other numbers of planes per die, such as four or eight planes per die can be used. Generally, a plane is a subdivision of the die 154 arranged with separate read/write/erase circuitry such that a given type of access operation (such as a write operation, etc.) can be carried out simultaneously by each of the planes to a common page address within the respective planes.

Figure 4:
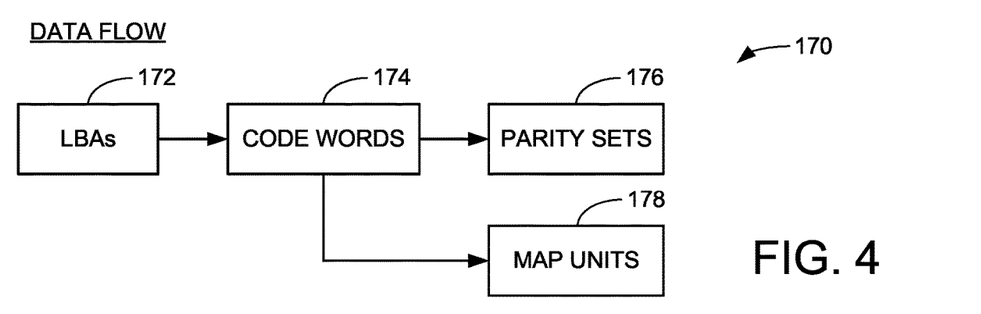
FIG. 4 illustrates a data flow for data stored by the SSD.

Input data from a client device such as 101 are processed in a manner illustrated by a data flow sequence 170 in FIG. 4. Other arrangements can be used. Blocks of data with associated logical addresses are presented at 172. The logical addresses may be logical block addresses (LBAs), but other forms can be used including key values, virtual block addresses, etc. The blocks are arranged into code words 174, which include user data bits and error correction code (ECC) bits to facilitate recovery during a read operation. The ECC bits may take the form of LDPC (low density parity check) bits.

A selected number of the code words are arranged into pages, and a selected number of pages are arranged into parity sets 176. In one non-limiting example, 31 pages of code words are combined using a suitable combinatorial function (e.g., exclusive or, XOR) to generate a parity value as a $32^{nd}$ page, and then all 32 pages of the parity set is written to a selected GCU. The parity value operates as outer code. Using a GCU size of 32 erasure blocks with one erasure block from each die, the outer code can facilitate data recovery even in the instance of a single die failure. Other forms of outer code, such as Reed Solomon codes, can be used as desired.

For mapping purposes, groups of the code words 174 are further arranged into map units 178. Map units represents groupings that enable the mapping system of the SSD to locate and retrieve the code words stored to the flash memory.

Figure 5:
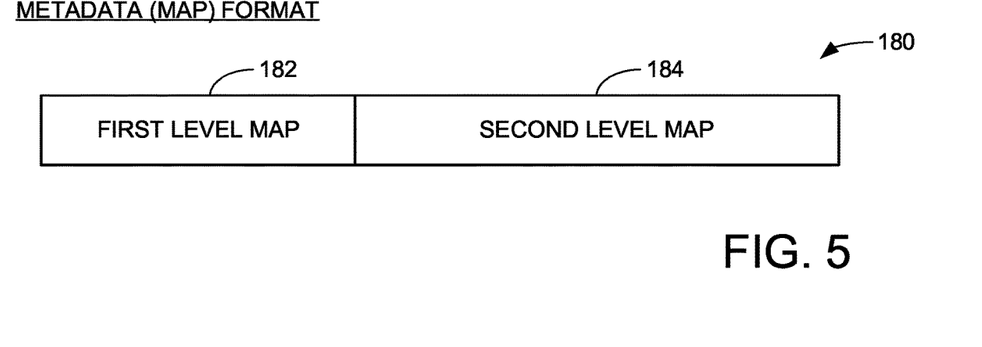
FIG. 5 is a format for map metadata used by the SSD.

A two level map 180 is represented in FIG. 5. Other mapping structures can be used including a single level map, a multi-level map with more than two levels, etc. The map 180 is metadata that includes a first level map 182 and a second level map 184. The second level map 184 operates as a flash transition layer (FTL) with a physical to logical association of addresses to enable location of the desired user data blocks. The first level map 182 generally indicates the locations of map descriptors that in turn identify the locations of the map units 178 in the second level map 184. Some, most or all of the first and second level maps 182, 184 may be loaded to local memory for use by the controller 112.

A typical data access sequence to service a client data transfer command may include accessing the first level map to identify the appropriate entry in the second level map, and accessing the second level map to identify the location in flash where the associated user data blocks are located. In the case of a read operation, the user data blocks are retrieved for further processing and return to the requesting client; in the case of a write operation, the new data blocks are written to a new location, and the metadata are updated. Maintaining accurate map metadata is generally necessary to enable the SSD 110 to accurately identify the current state of the system, and reliably service client access commands. Protection schemes such as error correction coding, redundant copies, etc. are applied to ensure the integrity of the map metadata.

Figure 6:
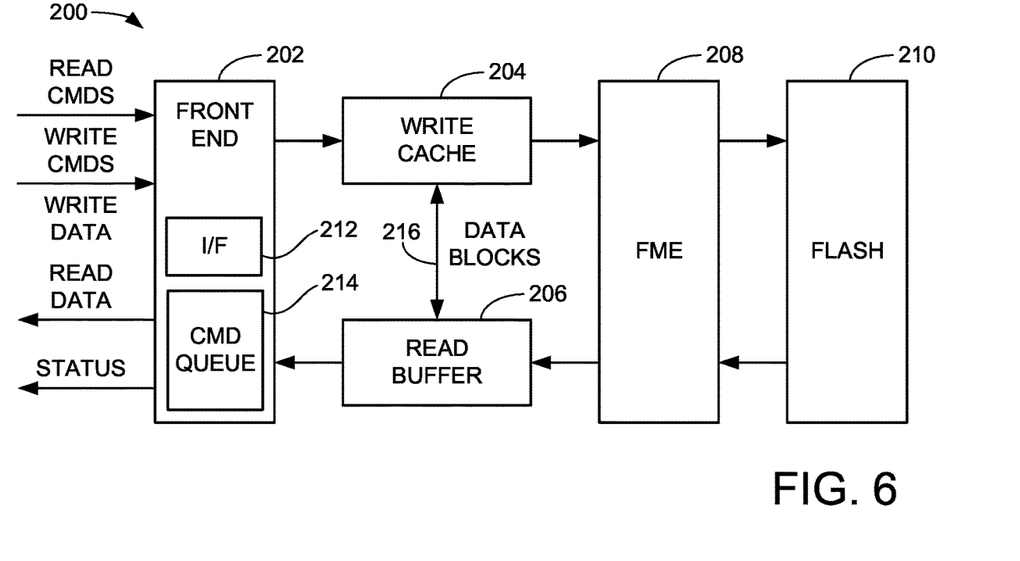
FIG. 6 depicts data paths through the SSD during the servicing of client access (read and write) commands in some embodiments.

FIG. 6 is a functional block representation of data path circuitry 200 of the SSD 110 in accordance with some embodiments. The circuitry 200 includes a front end 202, a write cache 204, a read buffer 206, flash memory electronics (FME) 208, and flash memory 210.

The front end 202 interfaces with one or more client devices 101 (FIG. 1) using an interface (I/F) circuit 212. Pending access commands are stored in one or more command queues 214.

During normal operation of the SSD 110, the client(s) will issue various access commands including read and write commands. Each client read command will constitute a request for some logical range (e.g., LBA range) of blocks to be retrieved from flash 210. Each client write command will constitute a request to store some logical range of blocks to the flash, and will be accompanied by a transfer of the associated writeback data from the client to the storage device.

The front end 202 processes these and other commands and arranges the respective read and write commands into one or more of the command queues 214 pending execution. The writeback data are stored in the write cache 204 and are subjected to processing as described above in FIG. 4 to arrange the writeback data into code words, pages, parity sets, etc. Additional processing may be applied as well, such as encryption and compression.

At such time that a command scheduler (not separately shown) of the controller 112 selects the next command to be serviced, the associated command/data are forwarded to the FME (flash memory electronics) 208, which in turn directs the same to the flash 210. The FME 208 is a rudimentary front end on each die or set of dies and serves to direct commands and data to the local read/write/erase circuitry of the respective planes. In the case of a write command, the writeback data are written to the next set of available pages 160 in an allocated GCU 164 (FIG. 3). In the case of a read command, the data are retrieved, subjected to error correction and other signal processing steps, and placed in the read buffer. The map metadata are accessed and updated as required during these operations.

Client read commands tend to receive priority over other commands, including client write commands and background commands, on the basis that the client is likely waiting for the requested readback data before it can proceed with subsequent processing steps. At the same time, the command scheduler function of the controller needs to execute the background operations (e.g., garbage collection, map updates, calibrations, etc.) at a sufficient rate to enable the storage device to continue to service the client access commands at acceptable performance levels. Another complicating factor is that the various competing pending commands and background operations may require the use of shared resources that have to be made available before the next command can be carried out. These resources can include data buffers, decoders, encryption/decryption circuitry, lanes, dies, registers, map data, etc.

Continuing with FIG. 6, the front end 202 provides various statuses to the client, including command complete statuses when commands are completed. For completed read commands, the command complete status may indicate that the requested readback data have been successfully retrieved and are now available for transfer from the read buffer 206. If writeback caching techniques are employed, the front end 202 may proceed to issue a write command complete status to the client, even if the writeback data are still pending in the write cache 204 and have not yet been written to the flash 210. To this end, the write cache 204 may take the form of NVM, such as NAND or NOR flash, although such is not necessarily required. The read cache 206 may normally be volatile memory, such as DRAM, since the readback data in the read cache can always be re-read from the non-volatile flash if required. In some cases, data blocks may be internally transferred between the write cache 204 and the read buffer 206, as indicated by internal data path 216.

Figure 7:
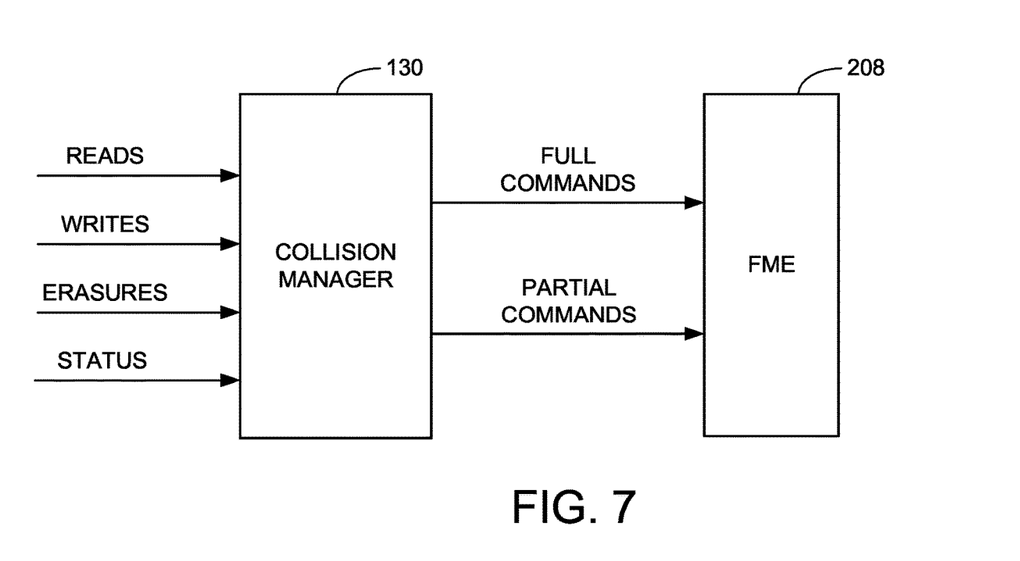
FIG. 7 shows a collision manager circuit of the SSD in some embodiments.

FIG. 7 depicts the command manager circuit 130 from FIG. 2 in greater detail. The circuit 130 operates to receive and process various commands from the command queues 214 including reads, writes, erasures and status requests. As noted above, these commands may be client commands or internal commands. The collision manager circuit 130 in turn issues various commands to the FME 208, including full commands and partial commands. Full commands comprise complete, or normal, commands such that, when completed, the circuit 130 can report to the upstream requesting process (e.g., front end, etc.) that the command is completed. Partial commands involve breaking down a particular command into multiple sub-commands, each of which may be performed by the FME at a different time. The results from the partial commands are assembled or otherwise formatted to provide upstream requesting process notification that the command is completed.

Figure 8:
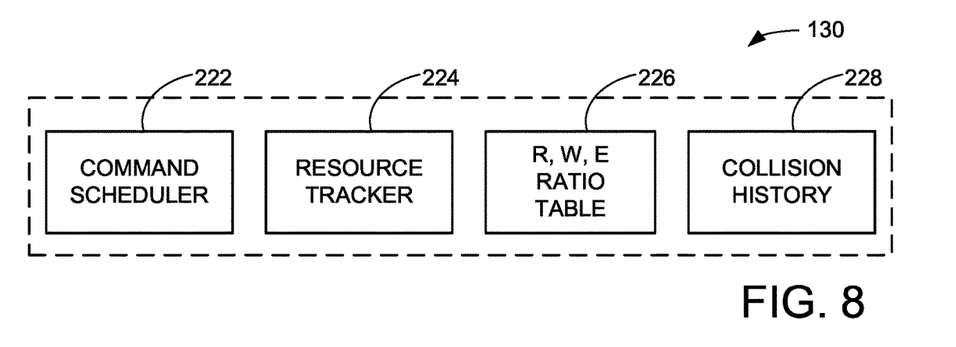
FIG. 8 illustrates aspects of the collision manager circuit of FIG. 7 in some embodiments.

The collision manager circuit 130 is shown in greater detail in FIG. 8. The arrangement is merely exemplary and is not limiting, as other configurations can be used.

A command scheduler 222 operates to select and forward the various commands to the FME 208 in a selected order and ratio. It will be appreciated that some commands may be order-sensitive. For example, a read command may be required to retrieve certain FTL map data before a read or write command can be carried out to the associated location, so it would be necessary for the command scheduler to execute the map data retrieval command prior to the associated read or write command. In another example, a read command may be required to retrieve the current version data blocks from a given GCU prior to executing an erasure of the GCU, and so on.

In addition to order requirements, the necessary shared resources need to be available in order to perform the various commands. As noted above, these can include availability of the associated dies/channels, as well as buffers, decoders, etc. To this end, the command scheduler can utilize a resource tracker circuit 224 which identifies the resources necessary for each command as well as indicates when such resources become available for use in servicing the next command.

A read, write and erase (R, W, E) ratio table is provided at 226. This is a data structure in memory that establishes baseline ratios for an appropriate mix of the various types of commands to be executed. As noted above, one example ratio set may be 64 reads for every write and 1000 reads for every erasure (thereby providing R, W, E ratios of 1, $\frac{1}{64}$ and $\frac{1}{1000}$, respectively). Other ratios can be used, depending on the requirements of a given environment. In this way, reads are given priority over writes and erasures. Sub-ratios can also be used; for example, some number X>1 client reads may be performed for every internal background read, etc. Similar sub-ratios can be provided for client writes v. internal background writes.

Collision history data is maintained in a collision history database 228. This provides a running listing of collisions that occur during the servicing of the various commands. It will be noted that actual collisions do not necessarily have to occur; it is sufficient, for example, that a given command is ready to be issued, but it cannot since the required resources are currently being used by a different command. The rate and types of collisions may be tracked (e.g., R v. R, R v. W, etc.) as part of the history table database. In some cases, only read command collisions are tracked since these are the commands that can have the greatest impact, from the standpoint of the client, upon the performance of the SSD.

The history data are thereafter used as required to make adjustments to various operational parameters of the system. In some embodiments, an increased level of collisions above a selected threshold for a given elapsed period of time may result in an adaptive adjustment of the ratios in the ratio table 226. In some cases, increasing the relative weighting of the writes and erasures may clear out a backlog based on needed capacity, so new values such as (1, $\frac{1}{48}$, $\frac{1}{600}$) may be implemented. In other cases, reducing the weighting of the writes and erasures may help to clear out a backlog based on lower I/O performance, so new values such as (1, $\frac{1}{96}$, $\frac{1}{1500}$) may be more suitable.

Figure 9:
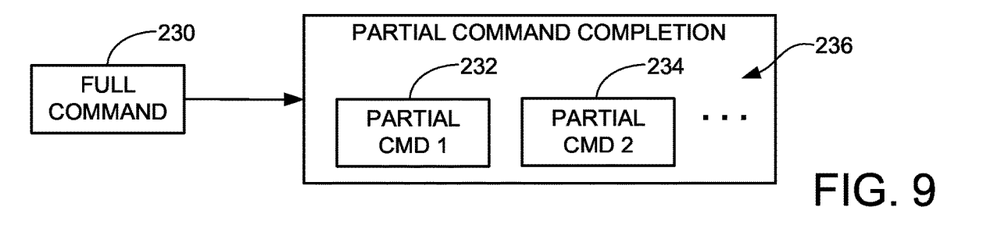
FIG. 9 shows operation by the collision manager circuit to divide a full command into a sequence of partial commands.

FIG. 9 is a schematic representation of partial command processing carried out by the collision manager circuit 130 in further embodiments. In this case, a full command is identified, such as represented by block 230. In the present example it is contemplated that the full command is a client read command, but other types of commands can be used.

A resource analysis for the command is performed by the resource tracker 224 (FIG. 8), which indicates that some, but not all, of the resources needed to complete the command are currently available. Instead of waiting until the entire set of resources are available, the collision manager 130 proceeds to break the full command 230 up into a series of sub-commands (partial commands), including a first partial command 232, a second partial command 234, etc. Each partial command covers a different portion of the overall readback data set for the full command. Once all of the partial commands have been executed, the full data set (represented by area 236) is assembled in the read buffer and forwarded to the requesting client.

While the collision manager circuit 130 will generally tend to arrange related data sets into areas that require the same resources (such as all of the data from a selected user on a particular set of dies and channels), it is contemplated that due to various factors, the data may be spread out, relocated, etc. so that not all of the resources required for a given command are within a given resource set. By utilizing partial commands, the collision manager circuit 130 can endeavor to substantially fully utilize all available resources in parallel fashion. The use of ratios can enable the manager circuit to further select from among existing commands of a particular class or type while ensuring that, overall, the correct mix of reads, writes and erasures are being executed. In this way, resources are utilized as needed in a JIT fashion.

Figure 10:
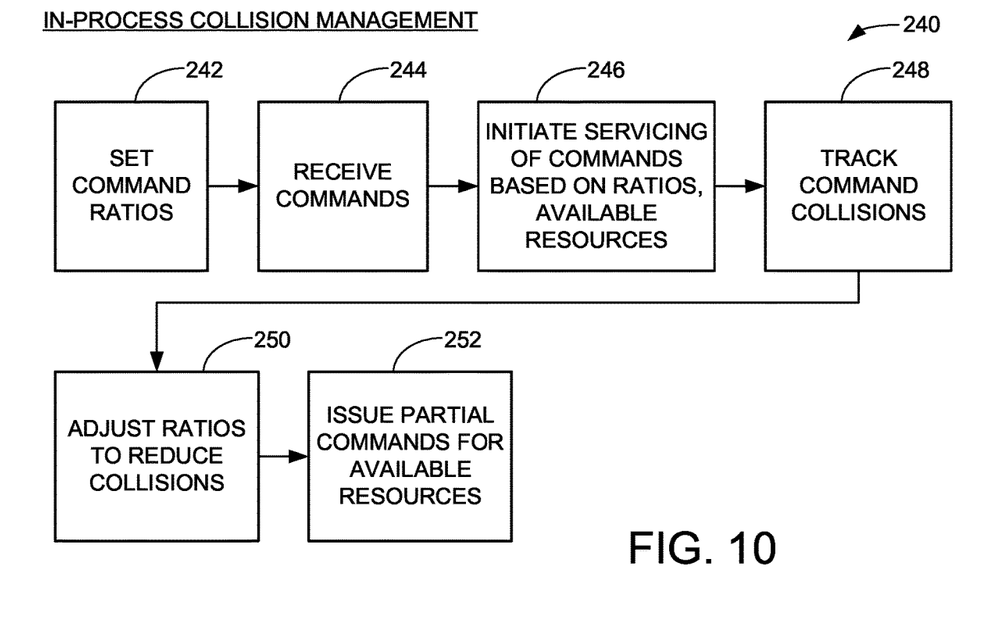
FIG. 10 is a sequence diagram to demonstrate collision management by the SSD in some embodiments.

FIG. 10 is a sequence diagram for an in-process collision management routine 240. The routine 240 describes the operation of the circuit 130 during normal operation of the SSD 110.

At Hock 242, various read, write and erasure ratios are initially set to appropriate levels. Baseline values may be loaded each time the device is initialized, or the most recently utilized ratio may be loaded after a power cycle. Normal operation commences at block 244, where various client and background commands are generated, received or otherwise queued as described above to perform data transfers with the flash 210.

At block 246, the commands are forwarded by the circuit 130 using the command scheduler 222 in an appropriate order based on the selected ratios and resource availability. During the servicing of the commands, various parameters are monitored including command collisions, block 248.

At such time that a rate or accumulated level of collisions exceeds a predetermined threshold, the ratios are adjusted, block 250. As noted above, the adjustments are adaptively made and may become new levels, or a short burst period of time may occur during which enhanced ratios are carried out, after which the system returns to the baseline level. Finally, block 252 shows that, in addition to the above operations, the system operates from time to time to issue partial commands based on the available resources. For example, if a selected read command requires retrieval of data from six different dies on six different channels, and only four of the die/channel combinations are currently available, the system will proceed to retrieve the data from the available dies/channels as a first partial read command, and then will schedule and execute a follow up, second partial read command to retrieve the requested data from the remaining two dies/channels.

While various embodiments have contemplated operation in the context of an SSD, this is merely for purposes of illustration and not limiting. Other forms of processing devices, including but not limited to hard disc drives (HDDs), hybrid drives, tape drives, etc. can also incorporate the various embodiments presented herein.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus, comprising:
a main memory comprising a front end electronics (FME) circuit and memory cells arranged on dies arranged as die sets accessible using parallel channels; and
a controller configured to arbitrate resources required by access commands to transfer data to or from the main memory using the parallel channels, to monitor an occurrence rate of collisions between commands requiring an overlapping set of the resources, and to adjust a ratio among the commands responsive to the occurrence rate of the collisions, the controller further configured to divide a selected command into at least a first partial command and a second partial command so that the first partial command utilizes a first set of resources that are currently available and the second partial command utilizes a second set of resources that are not currently available, the controller further configured to forward the first partial command to the main memory responsive to the first set of resources being currently available and subsequently forward the second partial command to the main memory responsive to the second set of resources becoming subsequently available, the controller further comprising a command scheduler configured to respectively direct the commands to the FME circuit in an order responsive to availability of the resources and responsive to the ratio.

2. The apparatus of claim 1, wherein a first ratio of read commands to write commands is established, and wherein a different second ratio of read commands to write commands is subsequently utilized responsive to a total number of accumulated collisions exceeding a predetermined threshold.

3. The apparatus of claim 1, wherein the memory cells are characterized as flash memory cells and wherein a ratio of the read commands to erasure operations to erase the flash memory cells is further adjusted responsive to the occurrence rate of the collisions.

4. The apparatus of claim 1, wherein the resources arbitrated by the controller comprise the dies, the parallel channels, and at least one shared buffer used during a write or a read operation to transfer data to or from the main memory.

5. The apparatus of claim 4, wherein the resources further comprise an error correction code (ECC) decoder circuit used during the read operation to transfer data from the main memory.

6. The apparatus of claim 1, wherein the controller further comprises a resource tracker circuit which, for each of the commands pending execution, identifies the associated resources required to execute the associated command and identifies availability of the associated resources at a selected period of time, wherein the command scheduler transfers a selected command to the FME circuit responsive to the identified availability, by the resource tracker circuit, of the associated resources for the selected command.

7. The apparatus of claim 1, characterized as a solid-state drive (SSD), wherein the main memory comprises a NAND flash memory and the controller comprises at least one programmable processor that utilizes programming instructions stored in a local memory in the form of firmware.

8. The apparatus of claim 1, wherein the access commands comprise read and write commands issued by an external client device over a client interface.

9. The apparatus of claim 8, wherein the access commands further comprise internal background commands generated by the controller to carry out at least a selected one of a calibration operation, a data relocation operation or a garbage collection operation.

10. A solid-state drive (SSD), comprising:
a flash memory comprising a plurality of semiconductor memory dies arranged into die sets connected to channels with each die set coupled to a separate channel, each semiconductor memory die further comprising flash memory cells arranged into garbage collection units (GCUs) allocated and erased as a unit;
a controller circuit configured to direct a transfer of data between the flash memory and an external client device coupled to the SSD via a host interface responsive to data transfer commands supplied by the external client device, the data transfer commands comprising read commands and write commands; and
a command collision manager circuit coupled to the controller circuit comprising a command scheduler which sequentially directs the data transfer commands to the flash memory in a selected ratio of a first type of command to a second type of command responsive to a predetermined selection by the controller circuit to store data to and retrieve data from the flash memory in accordance with the selected ratio, the command collision manager circuit further operative to monitor an occurrence of collisions between competing commands, to adjust the selected ratio to implement a different, second selected ratio of the first type of command to the second type of command responsive to the occurrence of collisions exceeding a predetermined threshold, and to subsequently store data to and retrieve data from the flash memory in accordance with the different, second selected ratio.

11. The SSD of claim 10, wherein the first type of command comprises read commands and the second type of command comprises write commands.

12. The SSD of claim 10, wherein the collision manager circuit further operates to divide a selected command into at least a first partial command and a second partial command, wherein the first partial command utilizes a first set of resources that are currently available and the second partial command utilizes a second set of resources that are not currently available, and wherein the command scheduler forwards the first partial command to the flash memory responsive to the first set of resources being currently available, and subsequently forwards the second partial command to the flash memory responsive to the second set of resources becoming subsequently available.

13. A method comprising:
storing data to a main memory comprising memory cells arranged on dies arranged as die sets accessible using parallel channels responsive to write commands;
reading the data from the main memory responsive to read commands;
executing the write commands and the read commands in accordance with a first selected ratio of the read commands to the write commands;
monitoring for collision events among the read commands and the write commands; and
adjusting the first selected ratio to provide a different, second selected ratio of the read commands to the write commands responsive to a total accumulated amount of the collision events exceeding a predetermined threshold; and
subsequently storing data to the main memory and reading the data from the main memory in accordance with the second selected ratio.

14. The method of claim 13, wherein at least a selected command from the write commands or the read commands is processed by dividing the selected command into a plurality of partial commands and sequentially executing the plurality of partial commands responsive to an availability of different resource sets required by the partial commands.

15. The method of claim 13, wherein the memory cells are characterized as flash memory cells and wherein a ratio of the read commands to erasure operations to erase the flash memory cells is further adjusted responsive to the occurrence rate of the collisions.

16. The method of claim 13, wherein resources are arbitrated by a controller during the executing step, the resources comprising the dies, the separate channels, and at least one shared buffer used during a selected write operation or a selected read operation to transfer data to or from the main memory.

17. The method of claim 13, wherein the main memory is characterized as a NAND flash memory of a solid-state drive (SSD).

18. The method of claim 15, apparatus of claim 8, wherein the read commands comprise client read commands from an external client and internal background read commands generated by a controller to carry out at least a selected one of a calibration operation, a data relocation operation or a garbage collection operation.

* * * * *